United States Patent
Gineste

[15] 3,648,032
[45] Mar. 7, 1972

[54] CONTROL INSTALLATION PROVIDING FOR SMOOTH TRANSFER BETWEEN DIGITAL AND ANALOG CONTROLS

[72] Inventor: Robert Maurice Gineste, Draveil, France
[73] Assignee: Appareils De Precision et De Controle'-'APC", Paris, France
[22] Filed: May 28, 1970
[21] Appl. No.: 41,723

Related U.S. Application Data

[63] Continuation of Ser. No. 667,162, Sept. 12, 1967, abandoned.

[30] Foreign Application Priority Data

Sept. 28, 1966 France ...................................... 77919

[52] U.S. Cl. ........................ 235/150.5, 235/151.1, 318/591
[51] Int. Cl. ........................................................ G06j 3/00
[58] Field of Search ................... 235/150.5, 150.51, 150.52, 235/150.53, 193, 151, 151.1, 150.3, 150.31, 150.4; 318/590, 591

[56] References Cited

UNITED STATES PATENTS

| | | | |
|---|---|---|---|
| 3,221,155 | 11/1965 | Birkel, Jr. | 235/150.5 X |
| 3,322,994 | 5/1967 | Dever et al. | 235/150.5 X |
| 3,330,943 | 7/1967 | Hawkins | 235/150.5 |
| 3,419,852 | 12/1968 | Silverman | 235/150.5 X |
| 3,479,492 | 11/1969 | Hornfeck et al. | 235/151.1 |

*Primary Examiner*—Joseph F. Ruggiero

[57] ABSTRACT

A control installation comprising a digital computer receiving data on a set value and an actual value and giving indications to a decoder controlling this element and adapted to control any element, such as a valve. The installation comprises an analogue controller which is connected in parallel with the computer on the circuit receiving data on the set value and actual value, and a changeover device which is disposed before the decoder and which can provide a changeover from control by the computer to control by the analogue controller.

2 Claims, 1 Drawing Figure

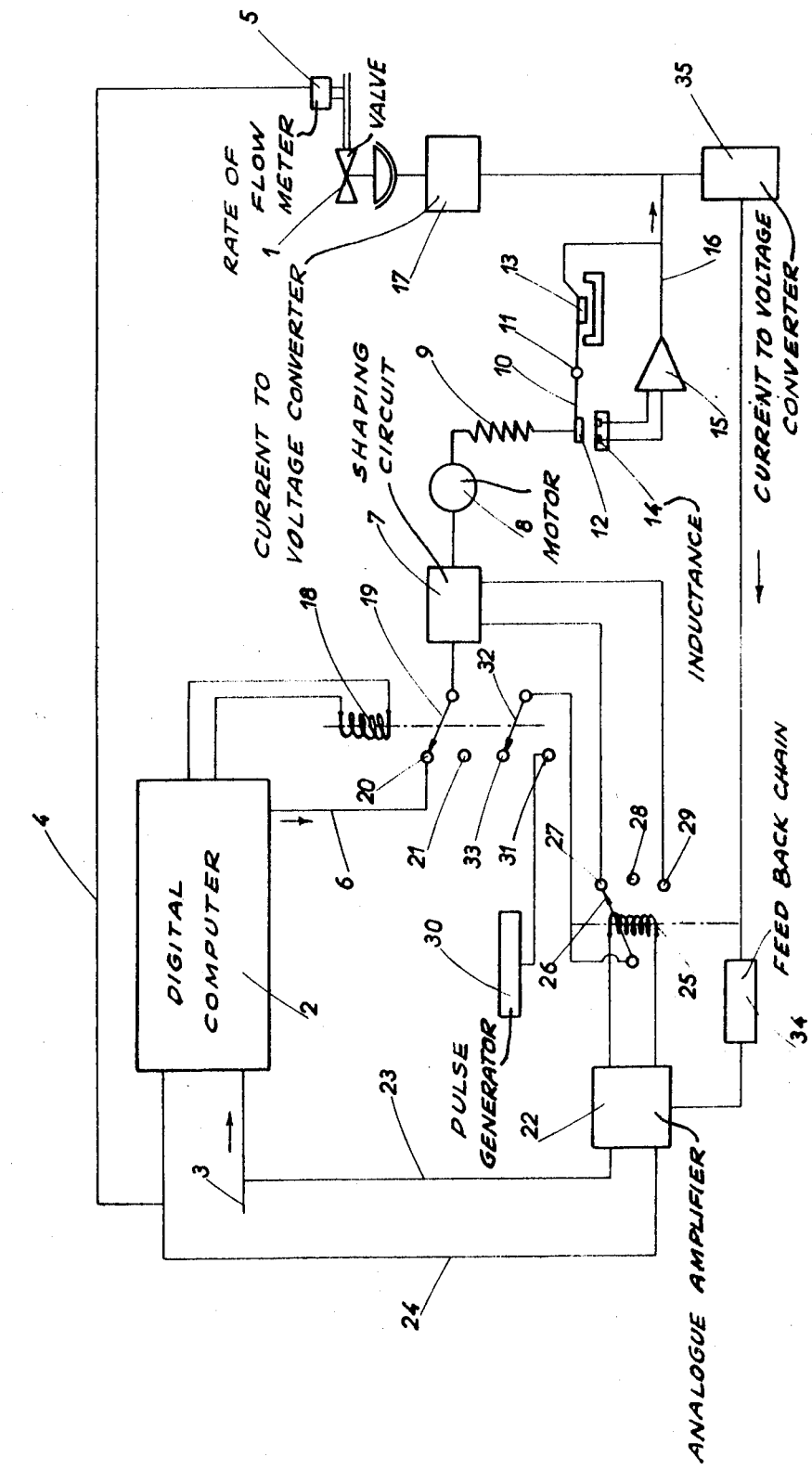

CONTROL INSTALLATION PROVIDING FOR SMOOTH TRANSFER BETWEEN DIGITAL AND ANALOG CONTROLS

The present application is a continuation of application Ser. No. 667,162, filed Sept. 12, 1967 and entitled "Control Installation," now abandoned.

This invention relates to a control installation for controlling device such as, for example, a valve.

The invention is of use more particularly in the case in which the control installation comprises a digital computer receiving data on a set value and the actual value from the device, the latter being controlled, e.g., through the agency of a valve, and giving indications to a decoder controlling such device.

It is an object of the invention to arrange for the case in which an analogue controller has to be substituted for the digital computer used for direct supervision of the device to be controlled. A substitution of this kind occurs more particularly in the event of the digital computer failing.

The difficulty in such a substitution is that it is essential not to have any lack of smoothness in the control at the time of the changeover from the digital computer to the analogue controller.

According to the invention, there is provided a control installation for controlling a device, comprising a digital computer for receiving data on a set value and an actual value from the device and giving indications to a decoder controlling the device, characterized in that the installation comprises an analogue controller which is connected in parallel with the computer to the circuit receiving data on the set value and actual value, and a changeover device which is disposed before the decoder and which can provide a changeover from control by the computer to control by the analogue controller.

The invention will now be described by way of example with reference to the accompanying drawing, the single FIGURE of which is a control diagram for a flow.

The installation shown is for controlling a flow regulated by a controlled device in the form of a valve 1. The control is normally provided by a digital computer 2 which acts directly on valve 1. Computer 2 receives data by way of a circuit 3 on a set value ordered by the user, and also receives data on the value of the rate of flow by way of a circuit 4 connected to an element 5 for measuring the rate of flow regulated by the valve 1.

The computer 2 gives control instructions for the valve 1 via a circuit 6 and a shaping circuit 7 controlling the rotation of a stepping motor 8. Each impulse received thereby rotates the same to one or the other direction through a small angle, in accordance with the instructions given by the computer. The shaft of motor 8 drives a nonreversible reducer (not shown) which increases or reduces the force of a spring 9 coupled with a balance. The same takes the form of a balance beam 10 pivotable on a spindle 11. A ferrite member 12 is disposed at one end of beam 10 and a winding 13 is disposed at the other end of beam 10. Disposed opposite the member 12 is an inductance 14 connected to an oscillating amplifier 15. Winding 13 is connected to output circuit 16 of amplifier 15. Circuit 16 supplies a current-to-voltage converter 17 governing the positioning of valve 1.

That part of the installation which comprises the shaping circuit 7, motor 8, spring 9 and balance 10, 12-14 and the amplifier and oscillator supplying the converter 17, is known and need not be described in full. The shaping circuit 7 and the motor 8 with which the balance is associated form the decoder of the installation.

In the event of a failure of the computer 2, the same sends an instruction to cut in the emergency analogue controller. This instruction can go to winding 18 of a relay which causes moving part 19 of such relay to change over from a contact, closing the circuit controlled by the computer, to an inoperative contact 21 which cuts out computer control.

The installation according to the invention comprises an analogue controller which will now be described and which takes the place of the computer 2 in the event of a failure thereof. The installation comprises first an analogue amplifier 22 which receives data on the set value via a circuit 23 and data on the actual value via a circuit 24. The analogue amplifier 22 energizes winding 25 of a relay of which a moving contact 26 can change over from a contact 27 to a contact 28, on which there is no control and which corresponds to the equilibrium state, as far as a contact 29. The contact 27 corresponds to actuation of the motor 8 to one particular direction and the contact 29 corresponds to actuation of the motor 8 to the opposite hand. The contacts 27, 29 are connected to shaping circuit 7 for controlling motor 8 and for control purposes in the event of computer 2 failing.

The shaping circuit is energized via contacts 27, 29 from a pulse generator 30. The same is connected to a contact 31, which can be contacted by moving part 32 of relay 18 when the computer has ordered a changeover from computer control to analogue control. The part 32, which was in the inoperative state on a stud 33, changes over to contact 31, and the pulse generator 30 can energize shaping circuit 7 by way of moving contact 26 disposed on one of the three contacts 27, 28 and 29.

As will be apparent, the analogue controller is connected to the decoding circuit in parallel with the computer.

The feedback chain 34 can directly connect the analogue amplifier 22 to a current-to-voltage converter 35.

When the changeover relay 18, 19 changes over from control by computer 2 to control by the analogue controller, the decoder output current is not immediately affected by this changeover, and the balance 10–12 and 13 remains in the position in which it was before disconnection.

The analogue amplifier 22 can be embodied by any high-input-impedance device having sufficient gain to trigger the three-position threshold relay for an input deviation compatible with the required accuracy which is, as a rule, of the order of 0.25 percent of the total scale.

The motor 8 which comprises a nonreversible reducer, provides consecutive rotations through a small angle which slightly increase or diminish the force of the spring 9 and therefore the voltage of the output current, the amplifier and oscillator 15 making the output current variation dependent upon the force of the spring. The output current is chosen to be about 0.1 percent of the total scale for each stepwise rotation of the motor shaft.

The converter 35 can take the form, for instance, of a resistance in the output circuit and some R.C. filter networks. A converter of this kind is familiar and needs no special description.

The feedback chain 34 is identical to the feedback chain for a conventional analogue controller, comprising a potentiometer and an R.C. PID (proportional-integral-derivative action) circuit.

What is claimed is:

1. A control installation for controlling a setting device comprising
    a decoder controlling the setting device from digital signals, inputs for said decoder, a digital computer and an analog controller each one receiving data on a set value and an actual value,
    a pulse source,
    a multithreshold relay responsive to the output signal of said analog controller and operative to selectively connect said pulse source to said inputs of said decoder and switch means operative to selectively apply to said decoder an output signal from said digital computer and pulses from said pulse source through said relay.

2. A control installation as set forth in claim 1, wherein said switch means is automatically responsive to a relay operated by said digital computer.

* * * * *